United States Patent
Rodach

[11] 3,841,580
[45] Oct. 15, 1974

[54] APPARATUS FOR BRAKING A PLURALITY OF SLIT STRIPS AS THE SAME ARE WOUND ON A REEL

[75] Inventor: Alexander Rodach, Pforzheim, Germany

[73] Assignee: Frau Irma Ungerer, Arlingerstrasse, Germany

[22] Filed: Nov. 23, 1973

[21] Appl. No.: 418,467

[30] Foreign Application Priority Data
Aug. 20, 1973 Germany.......................... 2342013

[52] U.S. Cl............................... 242/75.2, 226/195
[51] Int. Cl........................................... B65h 23/10
[58] Field of Search .............. 242/75.2; 226/39, 195

[56] References Cited
UNITED STATES PATENTS

| | | | |
|---|---|---|---|
| 3,386,679 | 6/1968 | Foulon........................... | 242/75.2 X |
| 3,468,494 | 9/1969 | Gaudin ............................. | 242/75.2 |
| 3,547,332 | 12/1970 | Gaudin ............................. | 242/75.2 |
| 3,666,195 | 5/1972 | Gaudin ............................. | 242/75.2 |
| 3,685,711 | 8/1972 | Gay................................... | 242/75.2 |

Primary Examiner—John W. Huckert
Assistant Examiner—Edward J. McCarthy

[57] ABSTRACT

The apparatus comprises at least one braking roll, which includes a rotatable braking roll shaft and a braking roll shell, which is divided into a plurality of braking rings, which are rotatably mounted on said shaft. Said roll further comprises bearing discs, which are interposed between adjacent ones of said rings and locked to said shaft for rotation therewith, first rolling elements disposed between and in rolling contact with adjacent ones of said braking rings and bearing discs, second rolling elements disposed between and in rolling contact with said braking rings and said shaft, and means for maintaining said braking rings and bearing discs in rolling contact with said first rolling elements and comprising first and second flanges mounted on said shaft and engaging opposite ends of said shell. Said first flange is power-operable to perform an axial movement relative to the other flange so as to adjust the axial pressure and the torque transmission between said braking rings and said shaft.

8 Claims, 3 Drawing Figures

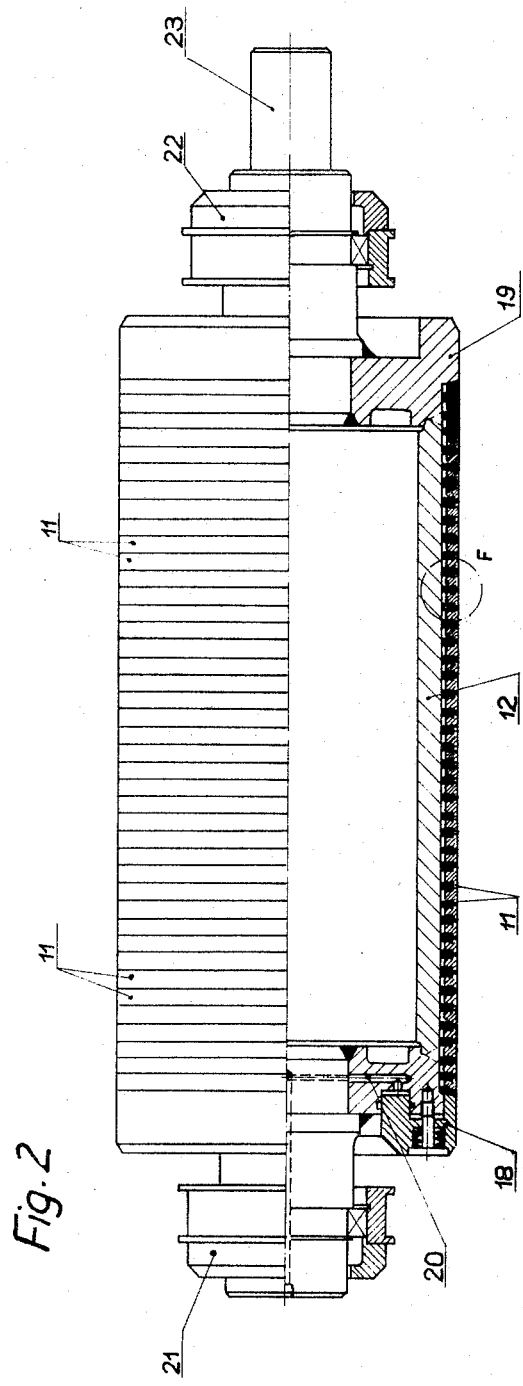
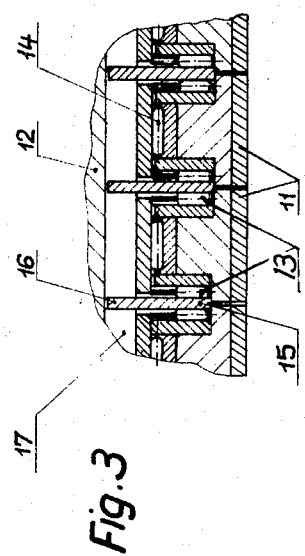
Fig. 2
Fig. 3

APPARATUS FOR BRAKING A PLURALITY OF SLIT STRIPS AS THE SAME ARE WOUND ON A REEL

This invention relates to an apparatus for braking a plurality of slit strips of metal as the same are wound on a reel in a plant for manufacturing and/or processing such strip.

In a previously proposed apparatus of that type the roll shell of the braking roll is divided into rings, which are rotatably mounted on the braking roll shaft and in friction contact and adapted to transmit a braking torque, which is adjustable. The rings forming the roll shell bear on each other with interposed braking discs, which are locked to the braking roll shaft for rotation therewith.

It is known that the slit strips made from a metal strip which varies in thickness across its width can be wound only with difficulty on a common reel shaft, mainly because of the overfeed which results in the winding of those slit strips which are formed by the thicker portions of the original strip. Those slit strips which are overfed give rise to trouble in the entire winding-up operation and necessitate a braking of each strip. The overfeed must be accumulated in a sagging portion of the strip.

Two kinds of strip-braking means are known. One kind is the so-called plate-type braking means consisting of two beams, which are covered with a brake lining consisting, e.g., of felt and can be forced against each other. The winding reel pulls the strips to be braked between these two beams. The roller braking means consist of a roller shaft, braking discs, and a roll shell which consists of several rings, which are radially supported and are braked axially in most cases. The plate-type braking means can be used only for strips which travel at low velocity and which need not be planar, because the heat which is generated promotes a formation of a non-planar strip. In both kinds of strip-braking means, the braking power is converted into heat, which is dissipated to the environment through the braking means and the strips. The braking power amounts to some kilowatts. For instance, if a strip having a width $B = 1,500$ millimeters and a thickness $S = 3$ millimeters and wound up at a velocity $V = 300$ meters per minute $= 5$ meters per second and under a tensile stress of $p = 1$ kilogram per square millimeter only, the braking power will be $N = P V/102 = B S p V/102 = 1,500 \times 3 \times 1 \times 5/102 = 220 \ kW = 52.5$ kcal/sec.

This relatively high heat rate has an adverse influence on the braking of the strip because the coverings on the roller are in most cases thermoplastic and the planarity of the original strip and the slit strips is adversely affected by the action of heat so that the value of the product is reduced.

It is an object of the present invention to avoid this considerable generation of heat in an apparatus for braking a plurality of slit strips of metal as the same are wound on a reel in a plant for manufacturing and/or processing strip, in which apparatus the roll shell of the braking roll is divided into rings, which are rotatably mounted on the braking roll shaft and adapted to transmit a braking torque, which is adjustable, and in which apparatus the rings forming the roll shell bear on each other with interposed discs, which are locked to the braking roll shaft for rotation therewith. This object is accomplished in that the braking roll shaft is braked by generator means relative to the motor driven reel, rollers are disposed between the braking rings and bearing discs interposed between the braking rings, and between the braking rings and the shaft, and the braking rings are operatively connected to an annular flange, which under control of a pressure fluid is adapted to move said braking rings toward and from a second annular flange, which is fixed or is also operable by a pressure fluid, whereby the transmission of torque between the braking rings and the shaft may be adjusted.

In this arrangement, the braking power applied by the strip-braking rollers is generated by the generators or pumps. As a result, the braking response of each of the braking rings of the strip-braking roll, which rings are associated with the slit strips, have such a good braking response that each ring begins to move with a virtually continuous change of force so that:

$$\mu\text{stat.}/\mu\text{dyn. } 1$$

An embodiment of a braking apparatus according to the invention will now be described by way of example with reference to the drawings, in which:

FIG. 2 is an elevation showing a braking roll according to the invention, partly in section; and FIG. 3 is an increased fragmentary view showing the portion F in FIG. 2 of the ring assembly of the roll shell.

Figure 1:
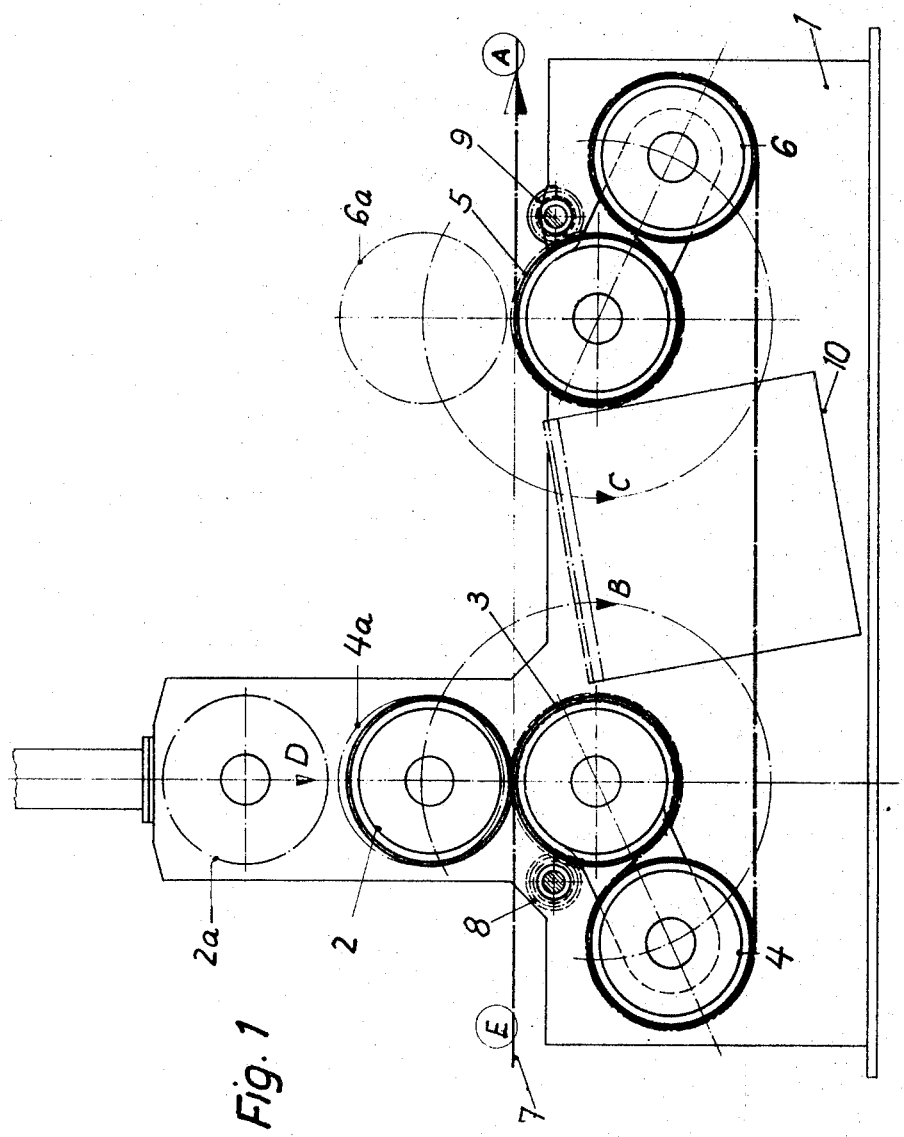
FIG. 1 is a diagrammatic view showing such braking apparatus.

As is apparent from FIG. 1 of the drawing, the braking apparatus comprises a frame 1 which carries, e.g., one pressure roll 2 and two reversing rolls 3 and 4 on the receiving side E and two further reversing rolls 5 and 6 on the delivering side A. To enable a threading of the strip, consisting in this case of slit strips 7, through the apparatus, the reversing roll 4 on the receiving side E and the reversing roll 6 on the delivering side A are movable from position 4a in direction B to position 4 and from position 6a in direction C to position 6 by means of respective turning mechanisms 8 and 9, and the pressure roll 2 is movable from position 2a in direction D to position 2, as is known per se. The folding table 10 serves in the usual manner to guide the slit strips 7 at the beginning of the operation.

According to the invention, as illustrated in FIGS. 2 and 3, the braking rolls 2 to 6 comprise roll shells, which are divided into braking rings 11, which are rotatably mounted on the braking roll shaft 12 and adapted to transmit an adjustable braking torque. The number of braking rolls will be selected in view of the braking action which is required.

The braking rings 11 are in contact with rollers 13 and 14 as shown in FIG. 3. Bearing discs 15 are disposed between adjacent rings 11 and are coupled to the braking roll shaft 12 by portions 16 locked in ribs 17 on the braking roll shaft 12. To enable an adjustment of the desired braking torque, the braking rings 11 are forced by means of an axially movable, pressure fluid-operable annular flange 18, which is fixed to the shaft 12, so that the rings 11 can be jointly forced together or released. The flanges 18 and 19 rotate with the shaft 12. The annular flange 18 is operated by hydraulic, pneumatic or electromagnetic means, which are energized through a duct 20. The braking roll shaft 12 is rotatably mounted at 21 and 22 and braked by electric generator means 23. In this way, the braking tension opposing the reel tension is produced. In accordance with the invention, the braking tension applied by the braking rings 11 to the several slit strips is uniform per unit of width throughout the width of the strip and is independent of the thickness of the several strips so that the same sag to different extents whereas the several coils on the reel are wound under a uniform tension per unit of width.

If the tension of the strip is predetermined, the pressure rolls and reversing rolls can be centrally controlled to adjust the respective torques exerted by the braking rings of each roll.

What is claimed is:

1. Apparatus for braking a plurality of slit strips as the same are wound on a reel, which apparatus comprises at least one braking roll, which includes a rotatable braking roll shaft, a braking roll shell, which is divided into a plurality of braking rings, which are rotatably mounted on said shaft, said roll further comprising bearing discs, which are interposed between adjacent ones of said rings and locked to said shaft for rotation therewith, first rolling elements disposed between and in rolling contact with adjacent ones of said braking rings and bearing discs, second rolling elements disposed between and in rolling contact with said braking rings and said shaft, and means for maintaining said braking rings and bearing discs in rolling contact with said first rolling elements and comprising first and second flanges mounted on said shaft and engaging opposite ends of said shell, said first flange being power-operable to perform an axial movement relative to the other flange so as to adjust the axial pressure and the torque transmission between said braking rings and said shaft.

2. Apparatus as set forth in claim 1, in which said second flange is fixed to said shaft.

3. Apparatus as set forth in claim 1, in which said second flange is power-operable to perform an axial movement relative to said first flange.

4. Apparatus as set forth in claim 1, which comprises pressure fluid-operable means for opwer operating said first flange.

5. Apparatus as set forth in claim 4, in which said second flange is power-operable to perform an axial movement relative to said first flange and pressure fluid-operable means are provided for power operating said second flange.

6. Apparatus as set forth in claim 1, for braking a plurality of slit strips, each of which has a width in excess of a predetermined minimum width, in which each of said rings has a width which is less than said minimum width.

7. Apparatus as set forth in claim 1, which comprises a plurality of said braking rolls.

8. In combination with a motor-driven reel for winding up a plurality of slit strips, apparatus for braking said slit strips as the same are wound on said reel, which apparatus comprises at least one braking roll, which includes a rotatable braking roll shaft, a braking roll shell, which is divided into a plurality of braking rings, which are rotatably mounted on said shaft, said roll further comprising bearing discs, which are interposed between adjacent ones of said rings and locked to said shaft for rotation therewith, first rolling elements disposed between and in rolling contact with adjacent ones of said braking rings and bearing discs, second rolling elements disposed between and in rolling contact with said braking rings and said shaft, and means for maintaining said braking rings and bearing discs in rolling contact with said first rolling elements and comprising first and second flanges mounted on said shaft and engaging opposite ends of said shell, said first flange being power-operable to perform an axial movement relative to the other flange so as to adjust the axial pressure and the torque transmission between said braking rings and said shaft.

* * * * *